United States Patent [19]

Sugai et al.

[11] Patent Number: 4,770,898
[45] Date of Patent: Sep. 13, 1988

[54] METHOD FOR PRODUCING OPTICAL FIBER

[75] Inventors: Masakatsu Sugai; Katsuyuki Tsuneishi; Yuji Kameo, all of Yokohama, Japan

[73] Assignee: Sumitomo Electric Industries, Ltd., Osaka, Japan

[21] Appl. No.: 916,396

[22] Filed: Oct. 7, 1986

[30] Foreign Application Priority Data

Oct. 9, 1985 [JP] Japan .................................. 60-223769

[51] Int. Cl.⁴ .......................... B05D 3/06; G01J 1/00; B29D 11/00
[52] U.S. Cl. .............................. 427/54.1; 250/504 R; 264/1.4; 264/1.5
[58] Field of Search .................... 427/54.1; 250/504 R; 264/1.4, 1.5

[56] References Cited

U.S. PATENT DOCUMENTS

| | | | |
|---|---|---|---|
| 2,453,770 | 11/1948 | Wendt | 427/54.1 |
| 4,100,418 | 6/1978 | Brown | 250/373 |
| 4,278,703 | 7/1981 | Toy et al. | 427/54.1 |
| 4,591,724 | 5/1986 | Fuse et al. | 250/504 R |

Primary Examiner—Norman Morgenstern
Assistant Examiner—Marianne L. Padgett
Attorney, Agent, or Firm—Cushman, Darby & Cushman

[57] ABSTRACT

A method for producing an optical fiber which comprises steps of:
  spinning an optical fiber from a molten preform for an optical fiber,
  applying a UV-curable resin to the surface of the spun optical fiber, and
  irradiating UV light through a layer of a material for absorbing UV light and a layer of a gas for preventing uncuring of the UV-curable resin to cure the UV-curable resin, by which the UV curable resin is homogeneously cured along its length.

3 Claims, 4 Drawing Sheets

METHOD FOR PRODUCING OPTICAL FIBER

BACKGROUND OF THE INVENTION

1. Field of the Invention

The present invention relates to a method for producing an optical fiber. More particularly, it relates to a method for producing an optical fiber having a surface of which is coated with an ultraviolet (UV)-curable resin.

2. Description of the Prior Arts

Conventionally, an optical fiber having a coating layer made of a UV-curable resin is produced by means of an apparatus for producing an optical fiber comprising a UV irradiating furnace as shown in FIG. 1. In the apparatus of FIG. 1, a preform 1 for an optical fiber is made molten by a heater 2 (for example, a carbon resistance heater) and drawn and spun to form an optical fiber 3. The optical fiber 3 is passed through a resin coating cup 4 in which a UV-curable resin is applied to the surface of the optical fiber 3 and then passed through a UV irradiating furnace 5 to cure the resin. The optical fiber coated with the cured resin is wound on a reel 11 through a capstan 10.

As shown in FIGS. 2A and 2B, the UV irradiating furnace 5 comprises an ellipsoidal reflection cylinder 6, a UV lamp 7 and a quartz tube in which a gas flowed to purge gases which prevent the curing of the UV-curable resin wherein the UV light 7 and the quartz tube are so arranged that each of their axes is aligned with each of the focus lines 6a and 6b of the ellipsoidal cylinder 6. When the optical fiber 3 applied with the UV-curable resin is passed through the quartz tube 8, the UV-curable resin is cured by focused irradiation of ultraviolet light emitted from the UV lamp 7.

According to the conventional method as described above, the UV-curable resin is evaporated by heat generated by the UV irradiating furnace during the optical fiber 3 is passed through the quartz tube 8 so that the evaporated resin is adhered and baked on the inner surface of the quartz tube and carbonized. Thereby, the amount of the UV light which passes through the wall of the quartz tube decreases as time passes so that the UV-curable resin on the surface of the optical fiber is not homogeneously cured along its length and the properties of the produced optical fiber are deteriorated.

SUMMARY OF THE INVENTION

One object of the present invention is to provide a method for producing an optical fiber having a coating layer made of a homogeneously cured UV-curable resin along its length.

This object is accomplished by a method for producing an optical fiber which comprises the steps of:
spinning an optical fiber from a molten preform for an optical fiber,
applying a UV-curable resin to the surface of the spun optical fiber, and
irradiating UV light through a layer in which a UV-light filtering material is flowed in order to control the UV light power which irradiates the UV-curable resin on the optional fiber.

DETAILED DESCRIPTION OF THE DRAWINGS

Figure 1:
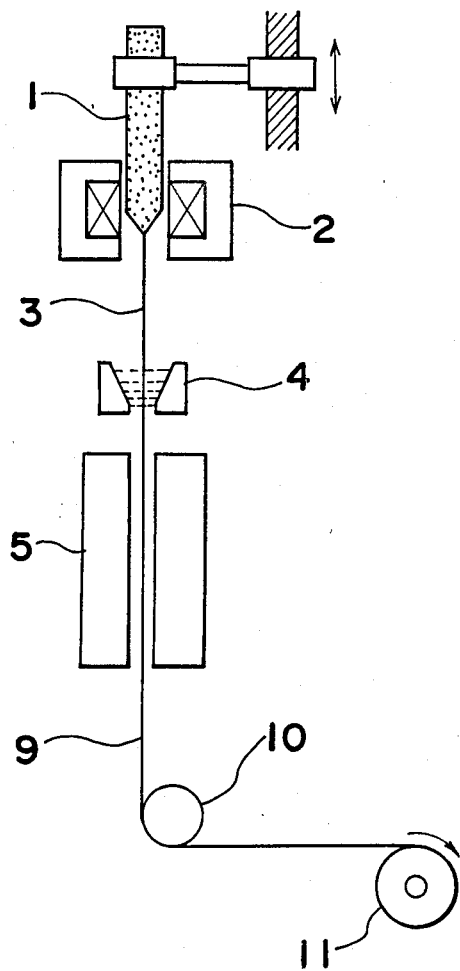
FIG. 1 schematically shows a conventional apparatus for producing an optical fiber having a coating layer of the UV-curable resin.
Figure 2A:
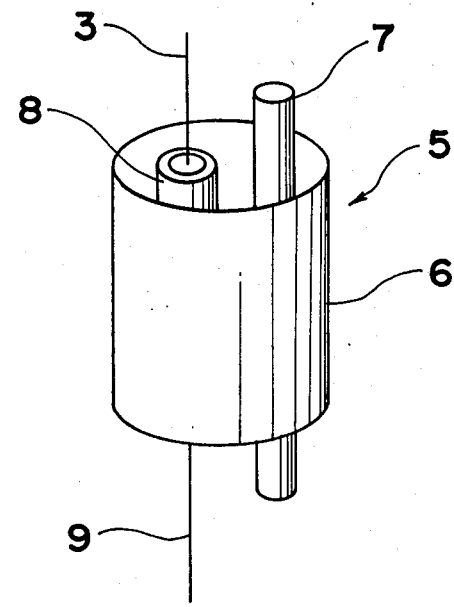
FIGS. 2A and 2B are a perspective view and a cross sectional view of the conventional UV irradiating furnace, respectively, FIG. 3 schematically shows an apparatus for producing an optical fiber having a coating layer of the UV-curable resin according to the present invention.
Figure 2B:
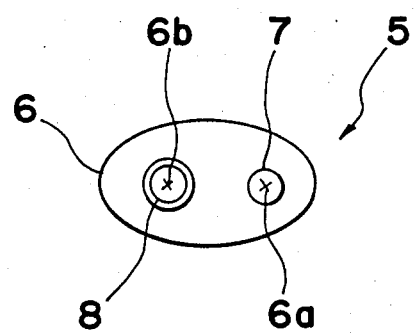
Figure 3:
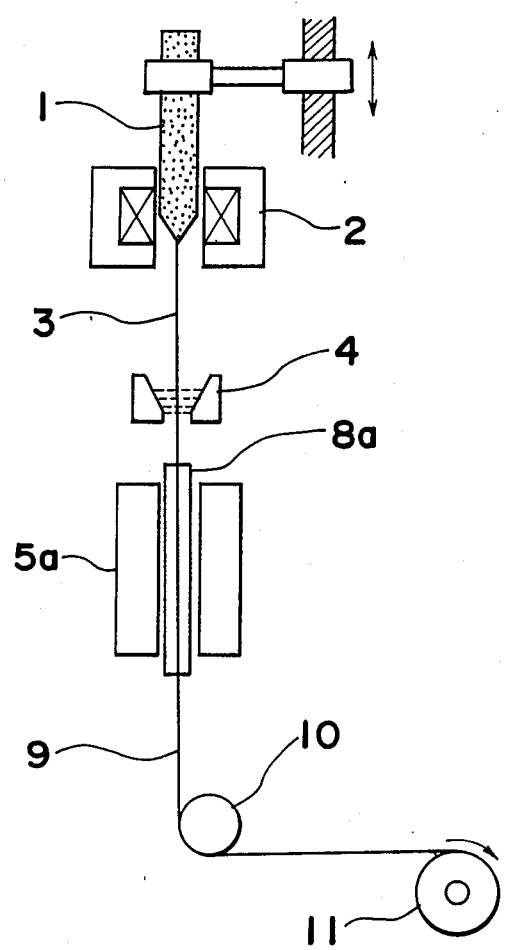
Figure 4A:
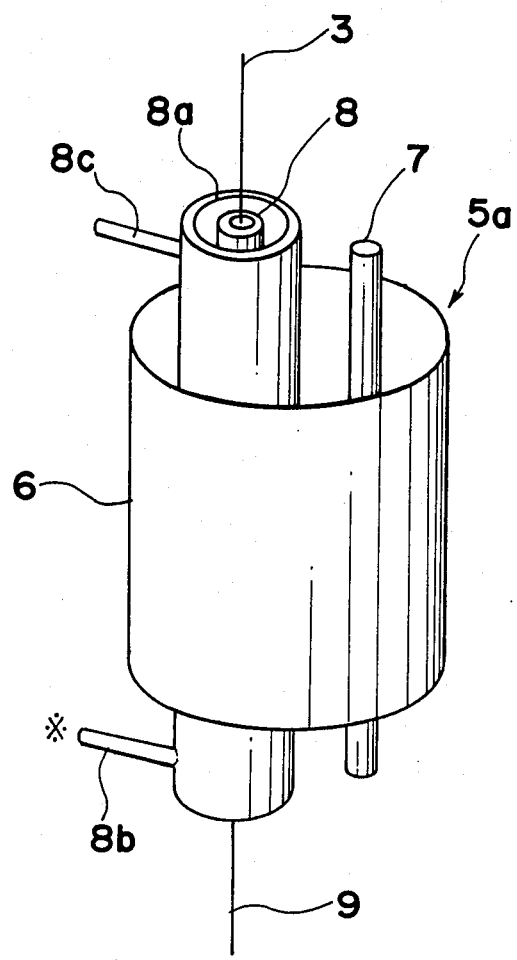
FIGS. 4A and 4B are a perspective view and a cross sectional view of a UV irradiating furnace composed in the apparatus of FIG. 3 according to the present invention, respectively.
Figure 4B:
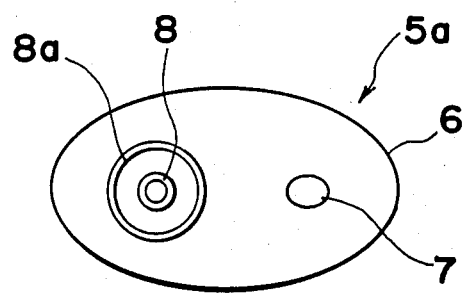
Figure 5:
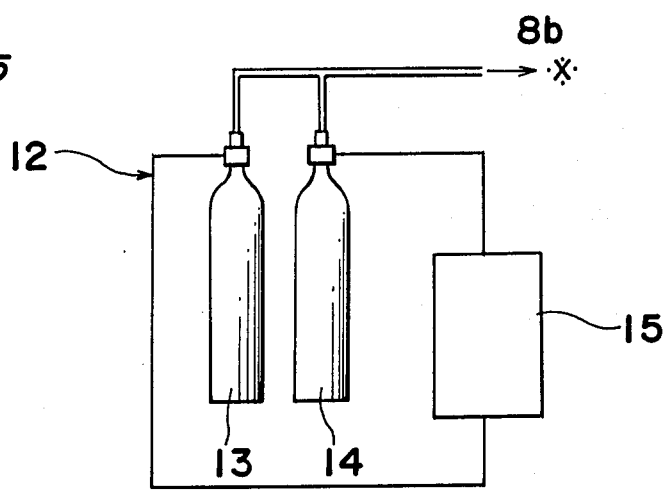
FIG. 5 shows a system for controlling flow rates of gases supplied to the UV irradiating furnace.

Referring to FIGS. 3 and 4 in which the same numerals as in FIGS. 1 and 2 stand for the same elements, a UV irradiating furnace 5a further comprises a quartz tube 8a which has a larger diameter than the quartz tube 8 and is concentrically installed around the quartz tube 8. In the gap between the quartz tubes 8 and 8a, a mixture nitrogen and chlorine is supplied through a inlet pipe 8b and exhausted through an outlet pipe 8c, whereby the layer of the material for absorbing UV light is formed. The gases are supplied from a system 12 for controlling flow rates of gasses shown in FIG. 5.

Figure 9:
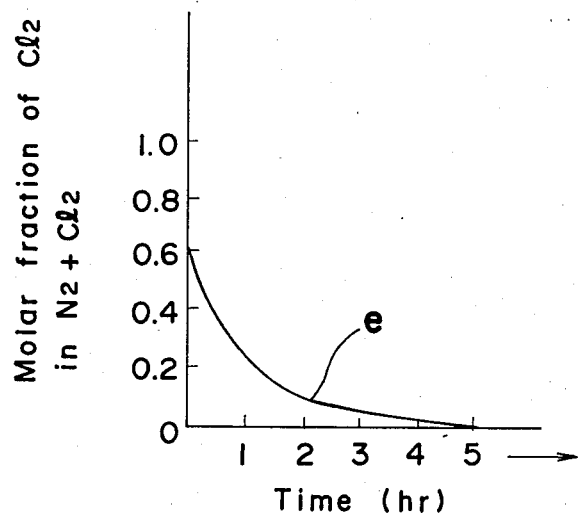
FIG. 9 shows the change of a molar fraction of chlorine in a mixture of nitrogen and chlorine as time passes.

The system 12 comprises a nitrogen gas bomb 13, a chlorine gas bomb 14 and a controlling circuit 15 and controls the flow rates of the nitrogen and chlorine gasses so that the ratio of the gasses changes according the line e shown in FIG. 9.

In place of the nitrogen and chlorine gasses, gaseous material shown in Table 1 can be used as the material for absorbing UV light. Table 1 also shows absorption peak wavelength of UV light for those materials.

TABLE 1

| Material | Absorption peak wavelength (nm) |
|---|---|
| $Cl_2$ | 330 |
| $F_2$ | 290 |
| $N_2$ | <134 |
| $O_2$ | 141 |
| $O_3$ | 256 |
| $H_2O$ | 167 |

The material for absorbing UV light may be used alone or as a mixture with other material(s) in a suitable ratio. The flow rate of the material and optionally the ratio of the materials are adequately changed so that the UV curable resin is homogeneously cured during the production of the optical fiber. The material for absorbing UV light may be a liquid one.

Figure 6:
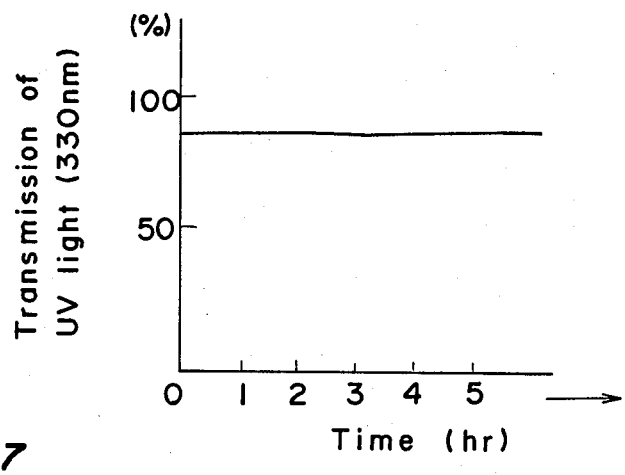
FIG. 6 shows the change of the transmission of UV light as time passes according to the present invention.

In the preferred embodiment, a gaseous mixture of nitrogen and chlorine is supplied to the gap between the quartz tubes 8 and 8a at a flow rate of 10 l/min. with the content of the chlorine gas in the mixture as time passes. During this period, transmission of UV light is measured which reaches the optical fiber after being passed through the quartz tube 8, the gaseous mixture layer between the quartz tubes 8 and 8a and the quartz tube 8a. The transmission of UV light (330 nm) is shown in FIG. 6. The molar fraction of chlorine (x) in the mixture of nitrogen and chlorine is expressed by $$x = \frac{Cl_2 \text{ (mole)}}{N_2 \text{ (mole)} + Cl_2 \text{ (mole)}}$$

Figure 8:
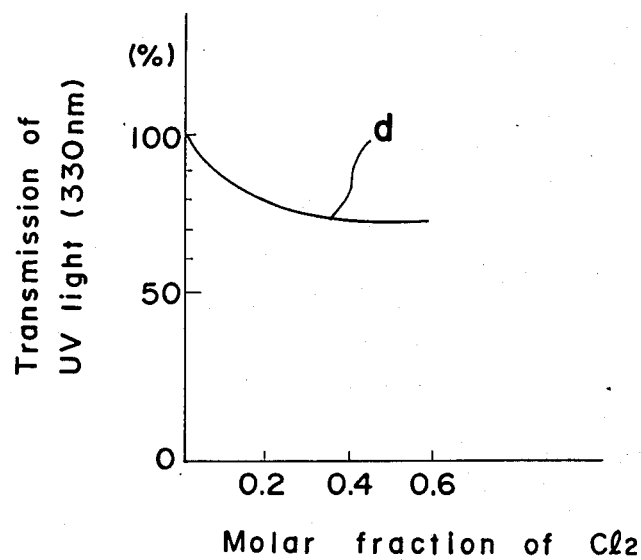
FIG. 8 shows a relationship between the transmission of UV light and a molar fraction of chlorine in a mixture of nitrogen and chlorine.

The relationship between the transmission of UV light and the molar fraction of chlorine in the mixture of nitrogen and chlorine is shown in FIG. 8, and the change of the molar fraction of chlorine with time is shown in FIG. 9.

Figure 7:
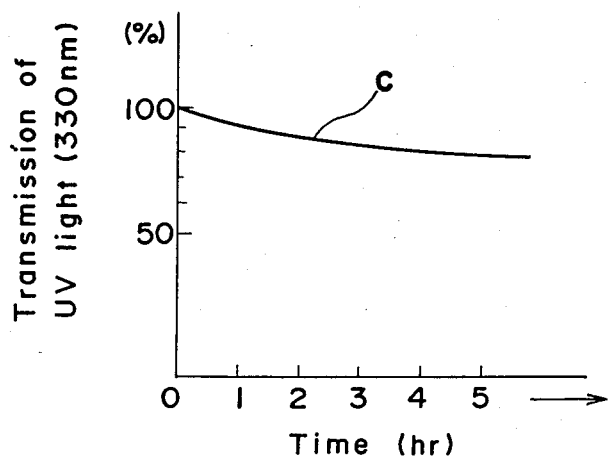
FIG. 7 shows the change of the transmission of UV light as time passes according to the conventional method.

When the optical fiber applied with the UV-curable resin is irradiated by UV light through only the quartz tube 8 according to the conventional method, the transmission of UV light decreases as time passes as shown in FIG. 7.

In the above embodiment, the mixture of nitrogen and chlorine is used as the material for absorbing UV light. However, when a material or a mixture of materials for absorbing UV light other than a mixture of nitrogen and chlorine is used, the changing mode of the flow rate can be easily determined by those skilled in the art by a simple routine experiment.

As understood from the above, since UV light is irradiated on the optical fiber through not only the quartz tube 8 for purging a gas for preventing uncuring of the UV-curable resin but also the material for absorbing UV light, UV light is uniformly irradiated on the optical fiber as time passes so that the UV curable resin is homogeneously cures along the length of the optical fiber.

What is claimed is:

1. A method for producing an optical fiber which comprises the steps of:
   spinning an optical fiber from a molten preform for an optical fiber;
   applying a UV curable resin to the surface of the spun optical fiber; and
   irradiating UV-light through a layer consisting of a mixture of a UV-light absorbing material and a diluent which scarcely absorbs UV light is flowed in order to make the cure rate constant along the length of the UV-curable resin by controlling the UV-light power which irradiates the UV-curable resin on the optical fiber.

2. A method for producing an optical fiber according to claim 1, wherein the amount of UV-light power which irradiates the UV-curable resin on the optical fiber is adjusted by changing the content of the UV-light absorbing material in the mixture.

3. A method for producing an optical fiber according to claim 2 wherein means for the UV light absorbing material is chlorine.

* * * * *